June 21, 1955  D. B. HOUGHTON  2,711,017
FOOD CHOPPER
Filed June 4, 1951

David B. Houghton
INVENTOR.

BY

United States Patent Office 2,711,017
Patented June 21, 1955

2,711,017

FOOD CHOPPER

David B. Houghton, Leslie, Ark.

Application June 4, 1951, Serial No. 229,669

3 Claims. (Cl. 30—130)

This invention relates to a food chopper of novel construction and design including a cutting member and an ejector especially designed for use in cutting and ejecting dough to make doughnuts, the device being also applicable for the purpose of chopping cooked foods, such as boiled potatoes, vegetables, hash, etc. in a common frying pan or chopping bowl.

An object of this invention is to provide a food chopper of the character described which is light in weight, attractive, very easy to manipulate, inexpensive, and includes a novel spring-mounted, plunger-actuated ejector.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views, in the accompanying drawings and in the following specification, similar reference characters indicate corresponding elements throughout.

Figure 1:
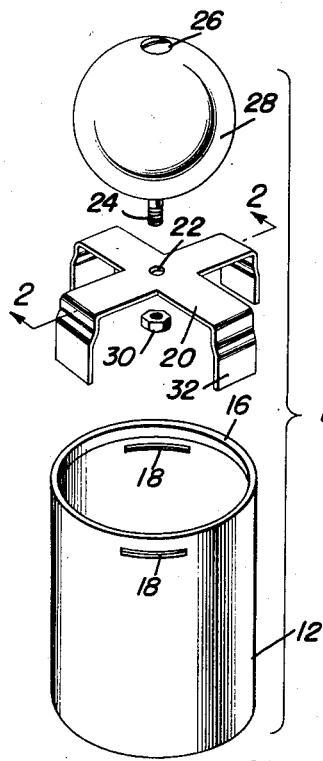
Figure 1 is a group perspective view of the chopper container per se.
Figure 5:
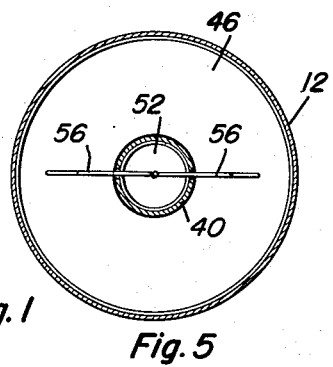
Figure 5 is a horizontal sectional view taken substantially on the plane of section line 5—5 of Figure 4.
Figure 3:
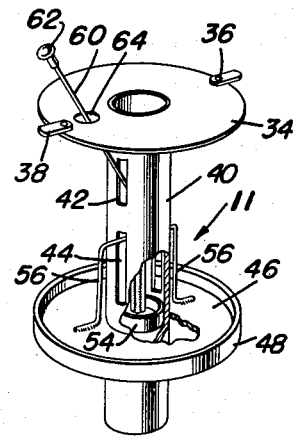
Figure 3 is a perspective view of the ejector per se.
Figure 2:
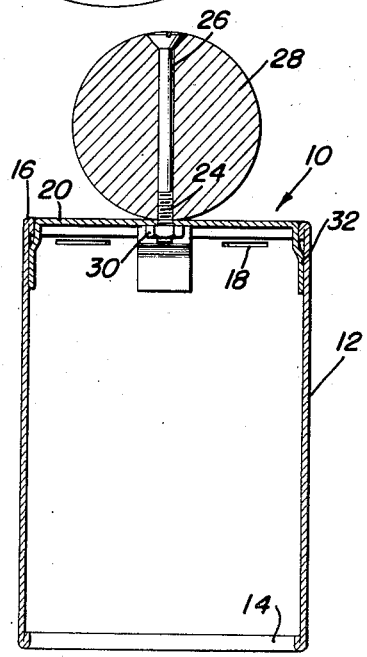
Figure 2 is a vertical sectional view through the chopper container and taken substantially on the plane of section line 2—2 of Figure 1.

It will be understood that various materials may be used to fabricate the present device. However, it is preferred that the device be light in weight, and therefore be fabricated of a light-weight metal such as aluminum, aluminum alloys, magnesium alloys, and thin chromium plated metals. The device comprises a chopper container generally indicated at 10 and an ejector generally indicated at 11 slidably mounted therein. The chopper container comprises a cylinder 12 open at its top and bottom ends, the bottom end being upturned to form an annular bead 14 serving as a press-type cutting edge. Adjacent the upper edge 16 of the container there is provided diametrically opposed circumferential slots 18 for a purpose later to appear. A cross-piece 20 is provided having a central aperture 22 which receives the threaded end portion 24 of a headed recessed bolt 26 supporting a spherical knob 28, the bolt being retained on the cross-piece 20 by a suitable internally threaded closure nut 30. The free ends of the cross-piece 20 are provided with depending leg portions 32 which are secured by any suitable means, such as spot welding, to the inner surface of the cylinder 12 adjacent its upper edge so that the cross-piece 20 lies flush with the free upper edge 16 of the cylinder 12.

Figure 4:
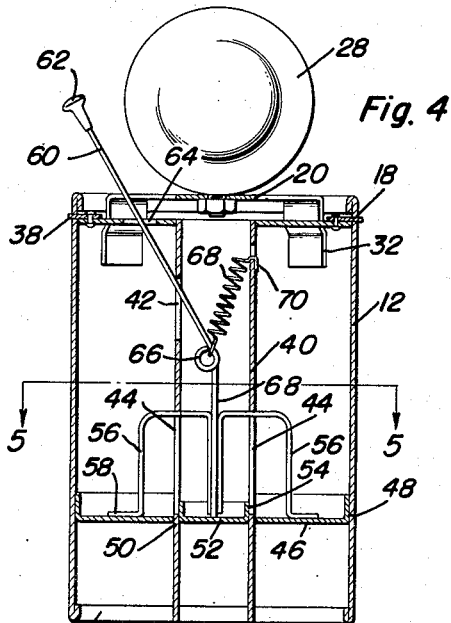
Figure 4 is a vertical sectional view through the container and the ejector mounted therein, the container handle being shown in elevation.

The ejector member 11 comprises a substantially circular plate 34 upon which is pivotally mounted, as at 36, in diametrically opposed relation, a pair of lugs 38 which can be moved into position to extend through the diametrically opposed circumferential slots 18 of the cylinder 12, as shown clearly in Figure 4, whereby the ejector is mounted within the cylinder. Depending centrally from the plate 34 is a vertically extending tube 40 which is concentric with the cylinder 12. The tube 40 is provided with an axially extending slot 42 adjacent the plate 34 and lower, diametrically opposed, axially extending slots 44 for a purpose later to appear.

A substantially circular ring 46 is provided having an upturned annular edge 48 slidably engaging the inner surface of the cylinder 12 and a central aperture 50 slidably engaging the tube 40. A substantially circular disk 52 is provided having an upturned annular flange 54 which slidably engages the inner surface of the inner concentric tube 40 and the ring 46 and disk 52 are secured together for unitary sliding movement within the cylinder 12 and on the tube 40 by means of substantially U-shaped diametrically opposed tie rods or wires 56 having one end portion 58 secured to the ring 46, and another portion which extends through the axial slot 44 and is secured to the inner surface of the disk 52, as shown clearly in Figure 4.

A plunger rod 60 is provided having an operating knob 62 at its upper free end, the rod extending slidably through a suitable aperture 64 in the plate 34 and also extending slidably through the upper axial slot 42 in the tube 40. The plunger 60 is bent adjacent its lower end to provide an eye 66 disposed within the concentric inner tube 40 and includes a lower rod portion 68 which is spot welded or riveted at its lower free end directly to the disk 52. A coil spring 68 is provided which is secured at its lower end to the eye 66 and at its upper end, as at 70, through a suitable aperture provided in the annular wall of the tube 40 adjacent the upper plate 34. The spring urges the ring 46 and associated disk 52 upwardly away from the lower cutting edge 14 of the cylinder 12.

In use, after the ejector and cutter container are assembled in a manner which will be obvious to one skilled in the art from the drawings, the device is grasped by the spherical handle 28 and the lower cutting edge 14 thereof is pressed into a suitable piece of dough, or other cooked food material, the dough entering the bottom portion of the cylinder 12. The plunger 60 is then pushed downwardly against action of the spring 68 so that the ring 46 and associated disk 52 will eject the cut dough through the lower edge of the cylinder 12 with the disk 52 serving to eject a central portion of the dough and produce a circular ring of dough with a central aperture in the form of a doughnut. Release of the plunger 60 will cause the spring 68 to pull the ring 46 and associated disk 52 upwardly and away from the cutting edge 14 of the cylinder 12, and it will be obvious, from this operation, that the cutter and ejector can be used rapidly and effectively to cut and chop various foods with a minimum of effort and manipulation.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A food cuttter comprising a cylinder having an upturned lower edge serving as a cutter, a handle and means rigidly securing the same to the upper end of said cylinder, a food ejector slidable in said cylinder, a plunger rod secured to said ejector for actuating the same, resilient means normally urging said ejector upwardly and away from the lower edge of said cylinder, a tube concentrically disposed within said cylinder, the lower end of said tube being open and the edge thereof constituting a cutter, and a plate carried at the upper end of said tube removably securing said tube to the upper end of said cylinder, said tube slidably mounting said ejector, said ejector including a ring having an upturned peripheral edge slidably mounted on said tube and concentrically surrounding said tube, a disk having an upturned peripheral edge slidable within said tube, axially extending, diametrically spaced slots in said tube, and ties extending through said slots and securing said ring to said disk for unitary movement, said plate being provided with an aperture and said tube with a further slot above one of said first mentioned slots, said plunger rod extending slidably through said aperture and said further slot and secured at its inner end to said disk and having its outer end terminating adjacent said handle.

2. The combination of claim 1 wherein said resilient means includes a spring secured at its upper end to said tube adjacent said plate and further secured at its lower end to the inner end of said plunger rod.

3. A food cutter comprising a hollow cylinder having an open upper end and an open lower end, the edge defining the lower end of said cylinder constituting a cutting edge, a tube concentrically disposed in said cylinder, an annular plate secured to the upper end of the tube and closing the upper end of the cylinder, the lower end of said tube being open and the edge defining the lower end constituting a cutting edge, said cylinder having diametrically opposed circumferential slots adjacent the upper end, a pair of diametrically opposed, radially extending lugs pivotally secured to the peripheral edge of said annular plate removably received in said slots, a food ejector slidably mounted on said tube and means for sliding said ejector, said ejector comprising an annular ring concentrically surrounding said tube having an upturned peripheral edge slidingly engaging said cylinder, and a disk having an upturned peripheral edge slidable within said tube, and a resilient spring in said tube normally urging said disk upwardly from the lower edge of said cylinder, said tube having axial, diametrically spaced slots therein and ties extending through said slots and securing said ring to said disk for unitary movement, said tube having a third axial slot spaced above said diametrically opposed slots and said annular plate has an opening angularly aligned with said slot, said ejector sliding means comprising a plunger rod extending through said plate opening and said third axial slot and having its inner end pivotally secured to said disk.

References Cited in the file of this patent
UNITED STATES PATENTS

| | | |
|---|---|---|
| 126,295 | Hidden | Apr. 30, 1872 |
| 230,294 | Lincoln | July 20, 1880 |
| 709,290 | Zinn | Sept. 16, 1902 |
| 965,991 | Craig | Aug. 2, 1910 |
| 1,088,070 | Haines | Feb. 24, 1914 |
| 1,380,560 | Johnson | June 7, 1921 |
| 1,430,373 | Hennings | Sept. 26, 1922 |
| 1,494,898 | Fults et al. | May 20, 1928 |
| 1,692,436 | Deane | Nov. 20, 1928 |
| 2,526,811 | Dawson | Oct. 24, 1950 |